United States Patent
Oattes et al.

(10) Patent No.: US 10,678,543 B2
(45) Date of Patent: Jun. 9, 2020

(54) ANALYTIC ENGINE FOR USE WITH REMOTE MONITORING DATA AND IMPERFECT ASSET MODELS

(71) Applicant: BL TECHNOLOGIES, INC., Minnetonka, MN (US)

(72) Inventors: Ryan Andrew Oattes, Oakville (CA); Christopher Ness, Oakville (CA)

(73) Assignee: BL TECHNOLOGIES, INC., Minnetonka, MN (US)

( * ) Notice: Subject to any disclaimer, the term of this patent is extended or adjusted under 35 U.S.C. 154(b) by 512 days.

(21) Appl. No.: 15/524,677

(22) PCT Filed: Nov. 7, 2014

(86) PCT No.: PCT/US2014/064484
§ 371 (c)(1),
(2) Date: May 5, 2017

(87) PCT Pub. No.: WO2016/072997
PCT Pub. Date: May 12, 2016

(65) Prior Publication Data
US 2018/0121201 A1 May 3, 2018

(51) Int. Cl.
*G06F 9/30* (2018.01)
*G06F 16/2458* (2019.01)
(Continued)

(52) U.S. Cl.
CPC ......... *G06F 9/30145* (2013.01); *G01N 25/00* (2013.01); *G05B 13/048* (2013.01); *G06F 9/3004* (2013.01); *G06F 11/0709* (2013.01); *G06Q 10/04* (2013.01); *F28C 1/00* (2013.01); *G06F 16/2477* (2019.01)

(58) Field of Classification Search
CPC ........ F28C 1/04; F28F 2200/00; G01N 25/00; G06F 9/30145; G06F 11/0709; G06F 11/2257; G05B 13/048
See application file for complete search history.

(56) References Cited

U.S. PATENT DOCUMENTS

2003/0216889 A1  11/2003 Marko et al.
2008/0065281 A1   3/2008 Tran
(Continued)

OTHER PUBLICATIONS

The Extended European Search Report issued for European Application No. 14905292, dated May 11, 2018, 7 pages.
(Continued)

*Primary Examiner* — Aimee Li
*Assistant Examiner* — Courtney P Carmichael-Moody
(74) *Attorney, Agent, or Firm* — Meunier Carlin & Curfman LLC

(57) ABSTRACT

A method including retrieving, by a processor, a standardized expression and one or more arguments for a calculation, attaching time-series parameters as required to the arguments, retrieving from a database time-series data based on the attaching step, converting, by the processor, the time-series data from an original unit associated with the data to a standard unit, performing a calculation based on the standardized expression to achieve a result, converting the result back to an original unit and then writing the result to a tag associated with the at least one argument.

7 Claims, 6 Drawing Sheets

(51) Int. Cl.
*G06Q 10/04* (2012.01)
*F28C 1/00* (2006.01)
*G01N 25/00* (2006.01)
*G05B 13/04* (2006.01)
*G06F 11/07* (2006.01)

(56) References Cited

U.S. PATENT DOCUMENTS

| | | | |
|---|---|---|---|
| 2009/0066524 A1* | 3/2009 | Yukawa | G01M 3/2815 |
| | | | 340/605 |
| 2010/0057634 A1* | 3/2010 | Janowski | G06Q 30/02 |
| | | | 705/36 R |
| 2011/0071963 A1 | 3/2011 | Piovesan et al. | |
| 2011/0173496 A1 | 7/2011 | Hosek et al. | |
| 2012/0030656 A1 | 2/2012 | Zingelewicz et al. | |
| 2012/0109534 A1* | 5/2012 | Kamihara | G01N 35/00603 |
| | | | 702/19 |
| 2012/0253746 A1 | 10/2012 | Kolar | |
| 2013/0132385 A1 | 5/2013 | Bullotta et al. | |

OTHER PUBLICATIONS

International Search Report and Written Opinion issued in connection with corresponding PCT Application No. PCT/US2014/064484 dated Feb. 4, 2015.

International Preliminary Report on Patentability issued in connection with corresponding PCT Application No. PCT/US2014/064484 dated May 9, 2017.

* cited by examiner

ANALYTIC ENGINE FOR USE WITH REMOTE MONITORING DATA AND IMPERFECT ASSET MODELS

TECHNICAL FIELD

The present disclosure relates to analytics calculation engines generally and in particular to methods and systems for applying analytics against an asset model.

BACKGROUND

Firms that use remote monitoring and diagnostic systems, for example, remote water monitoring and diagnostic systems, typically have a need to create a model of the particular assets being monitored. The number of assets and the type of assets may differ. Moreover, from site to site or even within a single site, similar assets may differ from each other. As such, the structure of assets built into the model may not always be perfect. For example, an asset at one site may have more or less sensor parameters that a similar asset at another site. Sometimes even assets within a site have differing parameters. Whether due to imperfect information, differences in physical installations, differences in specifications or malfunctioning equipment, the attributes of similar assets are rarely constant. Because of such differences, using a model for performance monitoring or maintenance calculations may yield less than perfect results.

In such an environment, it is difficult to apply standard analytics to run against a fleet of assets. Often, this results in a large number of customized analytics being created, adding costs and inefficiencies to the remote monitoring of multiple sites. This also is problematic when attempting to compare similar calculated quantities across the fleet.

BRIEF DESCRIPTION OF THE INVENTION

In exemplary non-limiting embodiment, a system is described in which the analytic system includes a memory having computer instructions and a processor coupled to the memory, wherein, when executing the computer instructions, the processor effectuates operations including retrieving an expression and one or more arguments for a calculation, attaching time-series parameters to arguments as required, retrieving time-series data based on the attaching step, converting the time-series data from an original unit associated with the data to a standard unit, performing a calculation based on the expression to achieve a result; and writing the result to a tag associated with the at least one argument.

In another exemplary non-limiting embodiment, a method is described in which a processor determines whether a standardized expression exists, and then, based on the determining step, retrieving the standardized expression and one or more arguments for a calculation, attaching time-series parameters to arguments as required, retrieving from a database, time-series data based on the attaching step, converting, by the processor, the time-series data from an original unit associated with the data to a standard unit, performing a calculation based on the standardized expression to achieve a result; and writing the result to a tag associated with the at least one argument.

The foregoing summary, as well as the following detailed description, is better understood when read in conjunction with the drawings. For the purpose of illustrating the claimed subject matter, there is shown in the drawings examples that illustrate various embodiments; however, the invention is not limited to the specific systems and methods disclosed.

BRIEF DESCRIPTION OF THE DRAWINGS

These and other features, aspects, and advantages of the present subject matter will become better understood when the following detailed description is read with reference to the accompanying drawings, wherein.

DETAILED DESCRIPTION OF THE INVENTION

Figure 1:
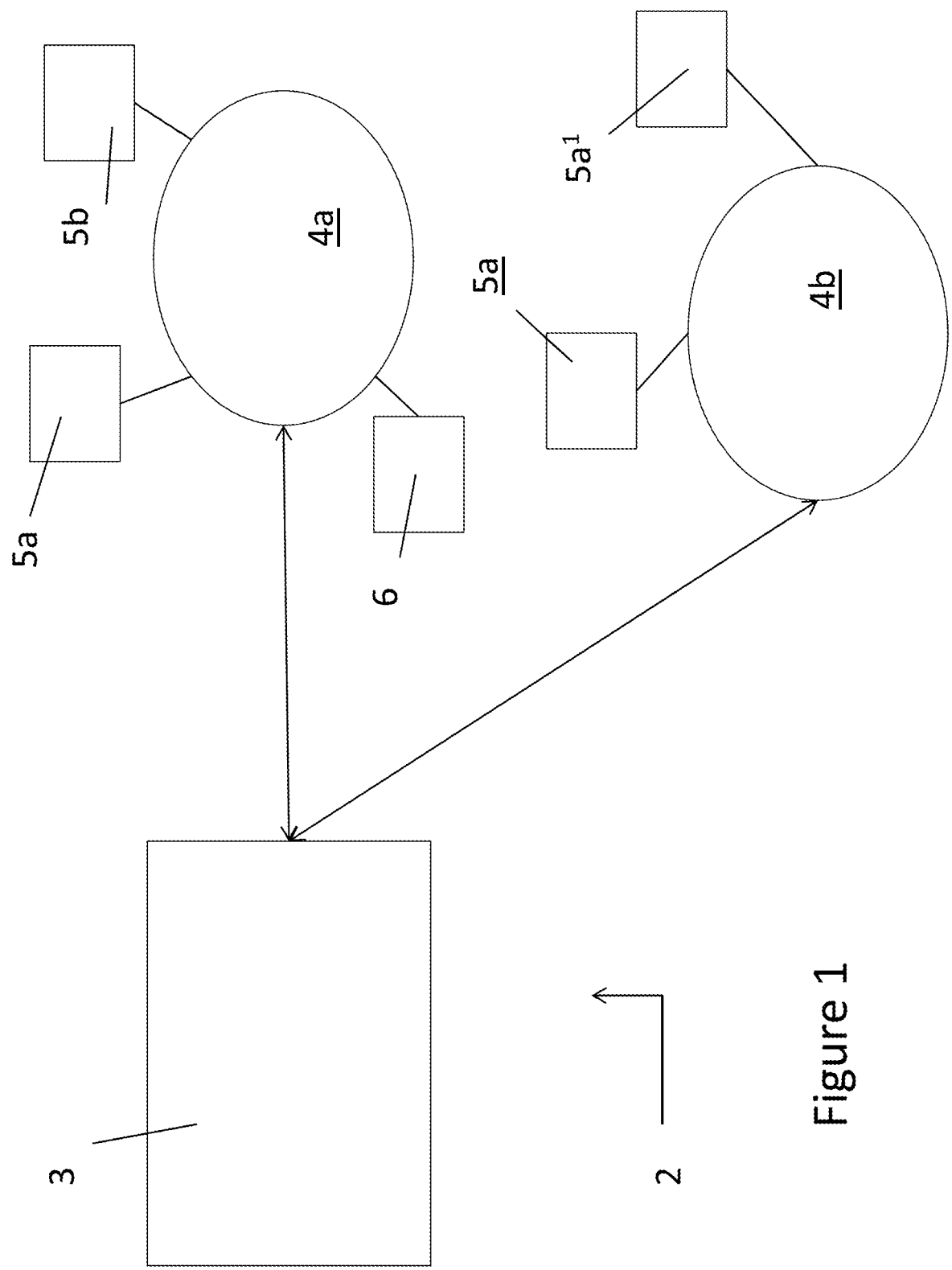
FIG. 1 is a functional block diagram of a non-limiting exmplary architecture for remotely monitoring a site.

FIG. 1 is a simplified exemplary non-limiting remote monitoring system 2 which illustrates a sample operating environment of the present disclosure. The remote monitoring system 2 may, for example, include a monitoring station 3 and remote sites 4a, 4b to be monitored by monitoring station 3. The monitoring station 3 may, for example, comprise a series of servers and workstations to be described in more detail below. The monitoring station 3 may be connected to remote sites 4a, 4b through any type of wired or wireless network, including but not limited to the internet, the public switched telephone network, wide-area network, local area network, cellular network, Wi-Fi network or any other type of private, proprietary or public network. Each of the remote sites 4a, 4b, may include a plurality of sensors which may, for example, monitor temperature, pressure or any other parameters at the remote sites 4a and 4b. In the example embodiment of FIG. 1, there are shown sensors 5a, $5a^1$, 5b and 6 wherein sensors 5a and $5a^1$ may be identical except for the units of measurement used, 5a and 5b may be similar in that both sensors are used to sense the same parameter, for example, pressure, while sensor 6 may monitor temperature. It will be understood that such sensors are exemplary only and any combination of identical, similar, or dissimilar sensors may be deployed at any remote site.

Figure 2:
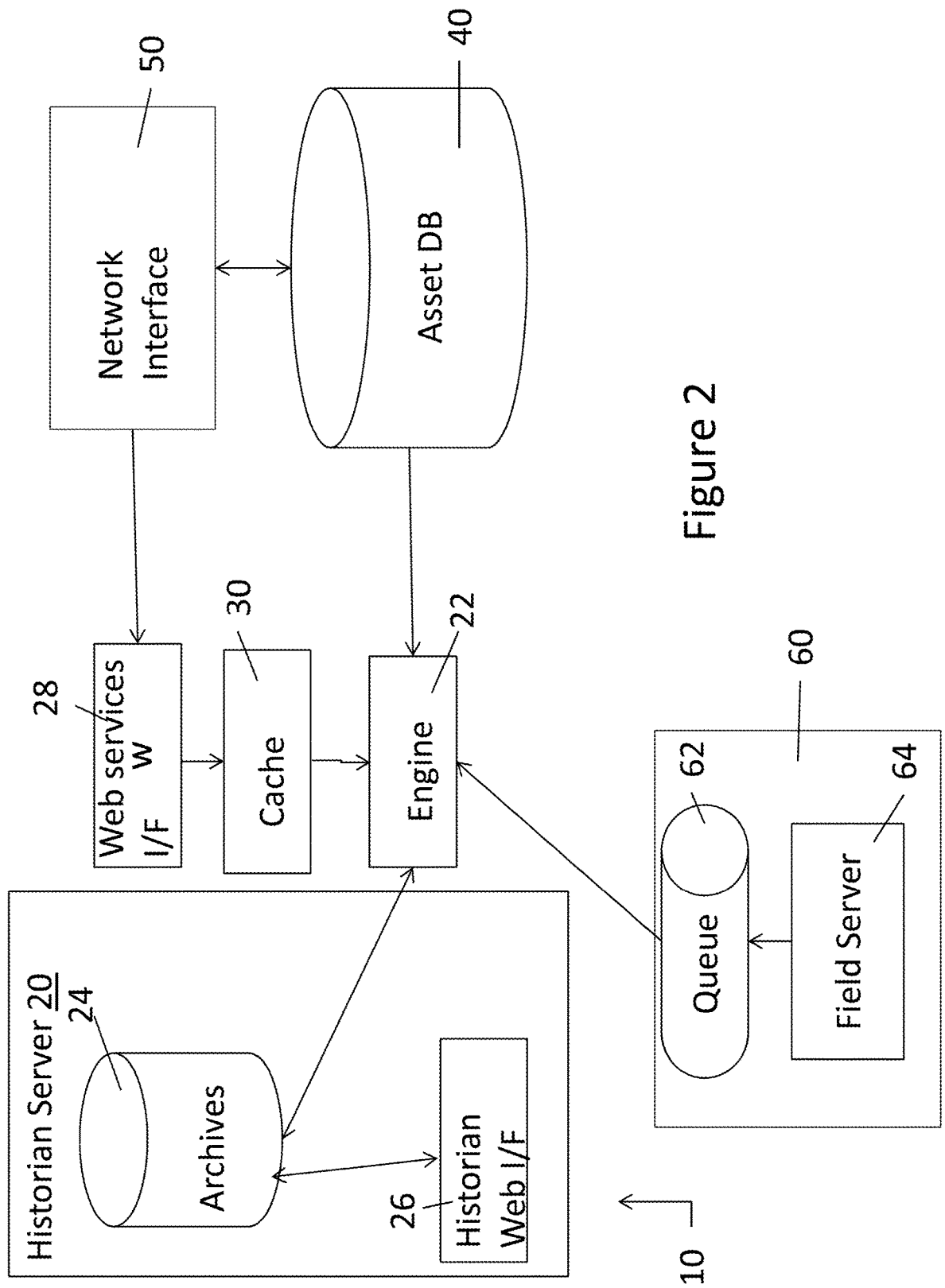
FIG. 2 is a functional block diagram of a non-limiting exemplary architecture for implementing a system having an analytic engine.

FIG. 2 illustrates a simplified exemplary non-limiting system architecture which includes an analytic engine in accordance with an embodiment of the disclosure. Such a system 10 allows a user to create a model of the assets to be monitored from a remote site and then perform analytics on the model to remotely monitor and provide diagnostic services to the remote site. The system 10 permits the use of particular models of assets and the structure of such assets as set forth in more detail herein.

With reference to FIG. 2, the system 10 includes an historian server subsystem 20, a database 40 of various assets, a network interface 50 and a trigger interface 60. The historian server subsystem 20 includes an archival database 24 in communication with a web interface 26 to access historical analytic information and modeling from other systems via a network such as the internet. Further comprising the system of FIG. 2 is a calculation engine 22 in communication with the archival database 24. A web services interface 28 is in communication with the engine 22 and may, for example, communicate with the engine 22 through cache 30. The web services interface 28 may be in communication with a network interface 50. The network interface 50 may provide connections to any type of public or private network or a combination thereof. For example, the network interface 50 may provide access to a wide area network, a local area network, a proprietary computer or telecommunications network, and/or the internet and may, for example, be wired or wireless. The network interface 50 may provide a communication path to a remote asset database such as database 40. Alternatively, the asset database 40 may be local to the server 20 and be in direct communication with the engine 22.

FIG. 2 also includes trigger interface 60. The trigger interface 60 may include a trigger queue 62 which receives triggers or other alerts from field server 64. The trigger queue 62 may, for example, be connected to the engine 22 such that upon the detection of a specific event to be relayed to the server 20 by the field server 64, the analytics will be initiated by the engine 22.

Figure 3:
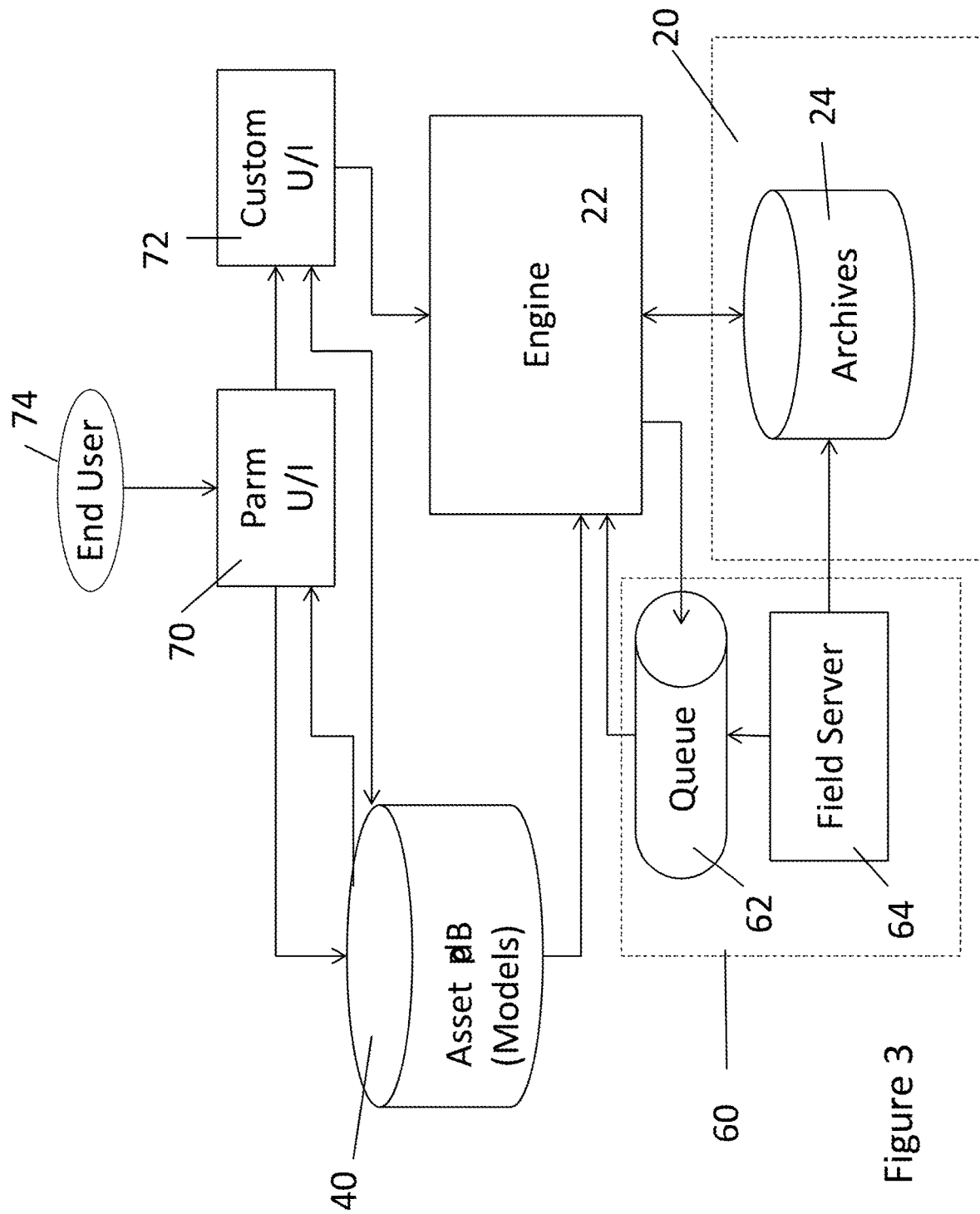
FIG. 3 is a block diagram of a non-limiting exemplary architecture of an analytic engine.

FIG. 3 illustrates another view of the exemplary embodiment of FIG. 2 which further illustrates user interfaces. Specifically and with reference to FIG. 2, there is shown a user 74, typically a member of the set-up team for a remote site, who has access to an asset database 40 through both a parameter value user interface 70 and a customized parameter value interface 72. The asset model database 40 contains a standard model which can be configured to any particular nuances of the remote site. The user 74 may, for example, configure a model of the remote site to be monitored by selected standardized asset models which represent the assets at the remote site using the parameter value user interface 70. The user 74 may, for example, select an asset model from the asset model database 40 through the user interface 70 by selecting both an asset and parameters to be associated with that asset. The asset model, may, for example be representative of a water cooling tower with a variety of sensors such as temperature, pressure, volume, and the like. The parameters and modeling equations may be provided in standard units and may, for example, comprise standard SI units such as C for temperature, kPa for pressure, etc. The user 74 has the ability to configure a model using either standard or customized calculations, wherein standard calculations may be more efficient and cost effective.

The standard calculations for derived values may be pre-programmed and contained in the asset database 40. In general, standard calculation may contain approved, pre-built expressions for derivation of a particular parameter type associated with an asset.

Figure 4:
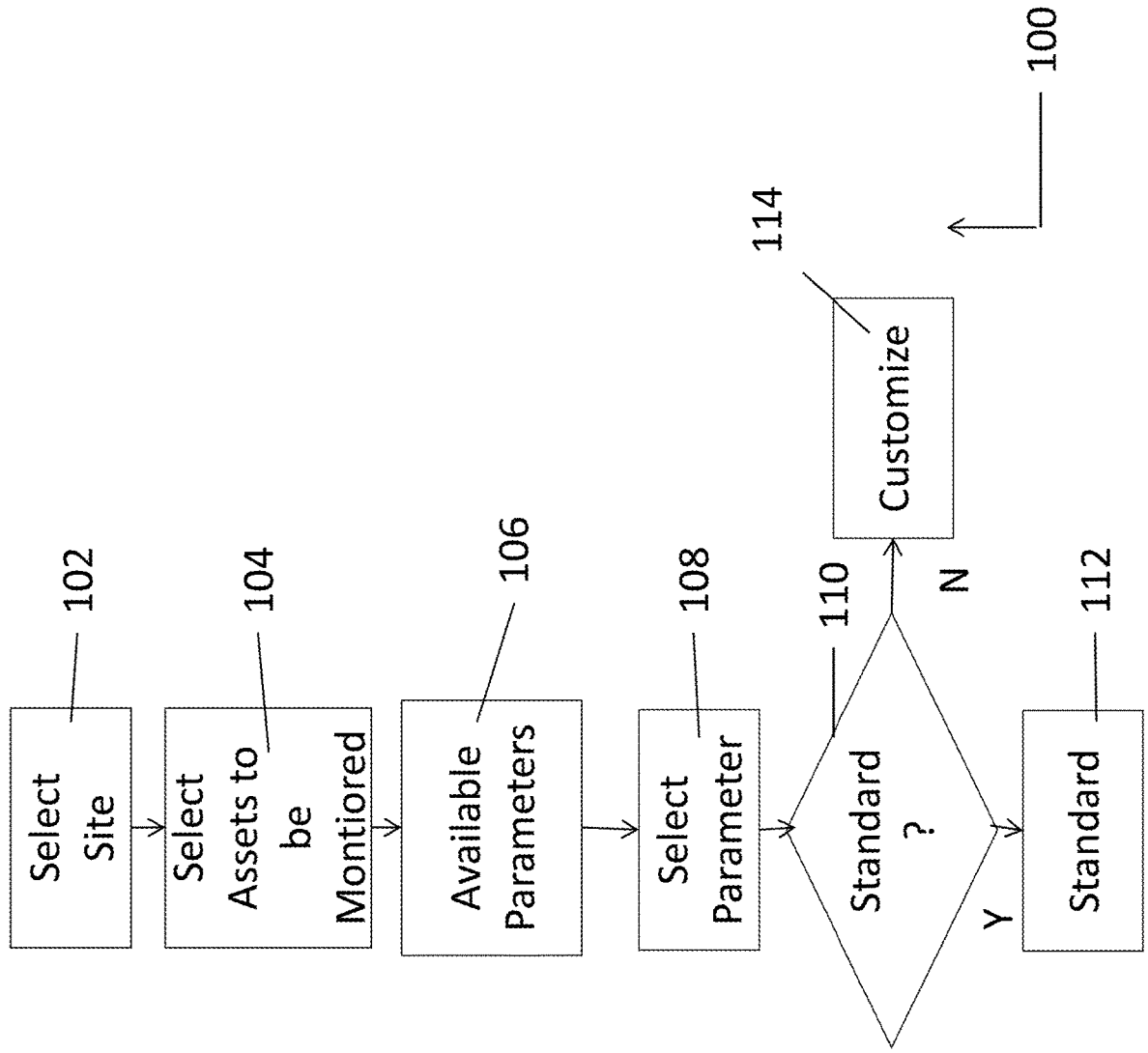
FIG. 4 is a flowchart of a non-limiting exemplary method wherein an asset model for a remote site is created.

With reference to FIG. 4, there is shown a flow chart 100 for user 74 to create an asset model for monitoring a remote site. At 102, the site is selected from the plurality of sites capable of being monitored remotely. At 104, the particular asset from that site is selected from a plurality of assets at the site. At 106, the user 74 is presented with the possible parameters of the asset. At 108, the user 74 selects the particular parameters of the asset to be analyzed. At 110, the system 10 identifies whether there is a standard calculation available for derived values for the parameter. If so, the user 74 selects the standard calculation at 112. If not, the user 74 selects a customized calculation at 114.

The end user 74 may, for example, build derived-value analytics by entering an expression to represent the calculation itself and then providing details about the arguments involved. Such details may instruct the engine 22 how to retrieve actual time-series data to plug into the calculation. In particular, the user 74 may provide information as to what type and how much data to retrieve, for example, the user may select a particular time-range of data or the number of data samples, as well as an identity of parameters from which to pull such historical data.

In operation, the configuration of the engine 22 may be preconfigured through an account setup function. To provide flexibility for applying the same calculation across many individual assets, the parameters may be specified using one or more tags, wherein a tag is the primary key identifier used to uniquely identify each time-series parameter. A tag pattern is a regular expression that matches appropriate tags which may appear in the modeling of different assets. The tag pattern enables the engine 22 to perform calculations in which there may be differences in configuration. For example, the tag pattern "WTR*LV" may be used to match against all tags containing "WTR" and "LV" and may, for example, include any number of intermediate characters between the two tags. To provide additional flexibility, the user 74 may specify an ordered list of tag patterns so that the engine 22 can attempt to solve for several options using standardized calculations.

Figure 5:
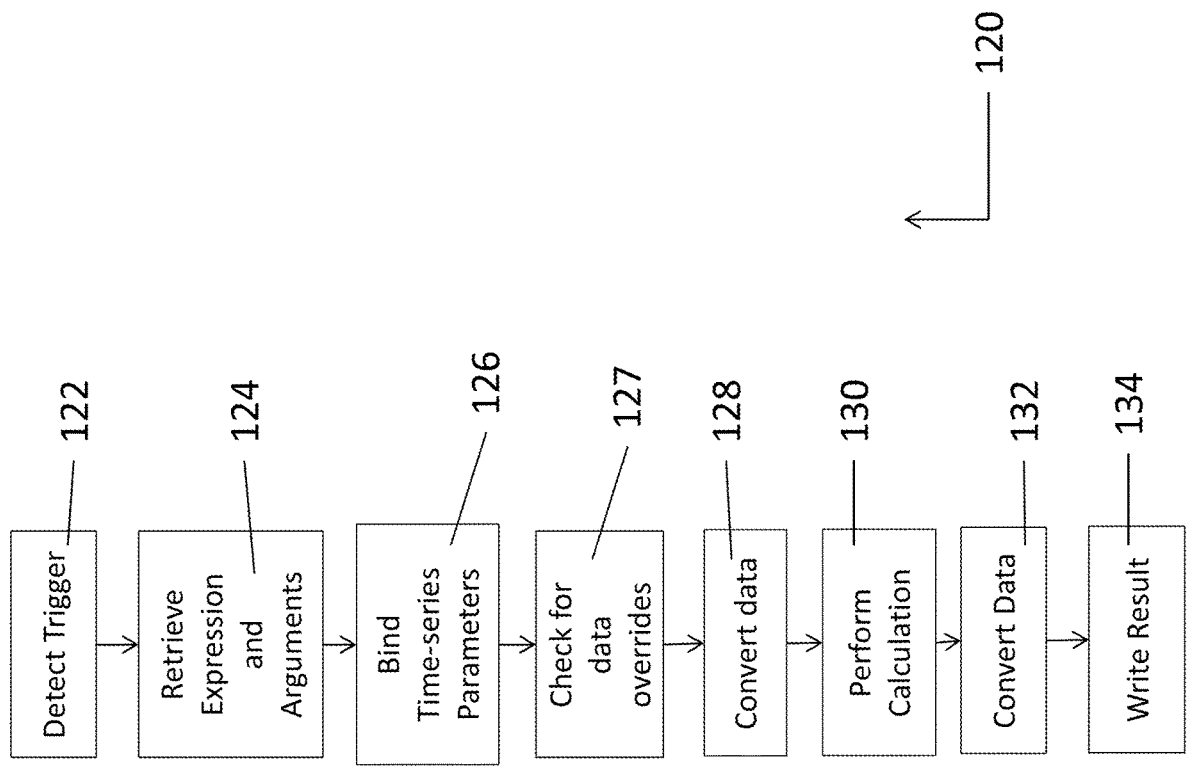
FIG. 5 is is flowchart of a non-limiting exemplary method for performing calculations in the engine.

With reference to FIG. 5, there is shown an exemplary, non-limiting method 120 which may be used by the engine 22 in performing calculations. At 122, the engine 22 may detect a trigger event. The trigger event, may for example, be received by the engine 22 through trigger interface 60. At 124, the engine 22 may retrieve an expression which may also include certain arguments associated with that expression. As used herein, an argument is roughly synonymous to "variable", although it contains details allowing the expression to be bound to a database of time-series data. At 126, the engine 22 may bind certain time series parameters to the expression. The time series parameters may include historical parameters that have been previously calculated over a certain time period. In one embodiment, time series parameters can be attached to the expression using metadata associated with the expression. This allows standardized assets to be defined in such a way that they can be used universally across asset metadata and time-series data that is inconsistent across an asset fleet. At 127, the engine 22 checks for data overrides. Data overrides are a binding step that is used when a variable cannot be bound to an asset model without intervention by a user. At 128 the data is converted to standard units so as to conform to the equation to be calculated. At 130, the calculation is performed, followed by the conversion of the result of the calculation back to its original units at 132. Finally, the result is provided at 134 which may, for example, be written to a tag associated with the parameter.

Such derived value calculations may be evaluated whenever new data becomes available from any of the assets being monitored. In a typical operation, for each calculation to be performed, at least one argument is selected to represent a trigger event. When new data arrives for a parameter bound to that argument, it will initiate a calculation.

The trigger interface 60 may serve as the entry point for new field data received by the system 10. When the field server 64 detects a trigger event, the field server 64 may place a message in a queue 62 that will be serviced by the engine 22 in an order specified by the system 10, which may, for example, by a first-in-first out processing order. When the trigger is being processed, the engine 22 may first retrieve the expression for the calculation along with a list of arguments. Then, the engine 22 may attempt to assign (or bind) certain time-series parameters to each argument so that historical data may be retrieved. Thereafter, the time-series data may be converted from local units, for example, locally used English units of measure such as degrees Fahrenheit, to a standard set of units, i.e., degrees Celsius, which allows calculation equations to be written once and used on any global asset, regardless of any local units of measure being used. The calculation is then executed, the results are converted back into the appropriate unit of measure, typically the local unit of measure being used, and then written to the tag attached to whichever parameter is defined as the output.

In the event that there is an asset to be monitored that has not been previously modeled in the system 10, the user 74 may use the customized interface 72 available in the system 10 to develop a customized equation for calculation of the parameters associated with the asset and then use that customized calculation whenever a new trigger event is detected by the field server 64 that is associated with that asset. In this manner, the system 10 is able to monitor any site regardless of the assets or configuration of assets being monitored.

The engine 22 may use any appropriate programming language in which the expressions to be used are valid and consistent with the programming language. At run-time, the expressions may be executed using either native evaluations or evaluations pulled from a safe-execution library. The safe-execution library may be used for all expressions entered and act as a security measure to protect against malicious code injection attacks.

Figure 6:
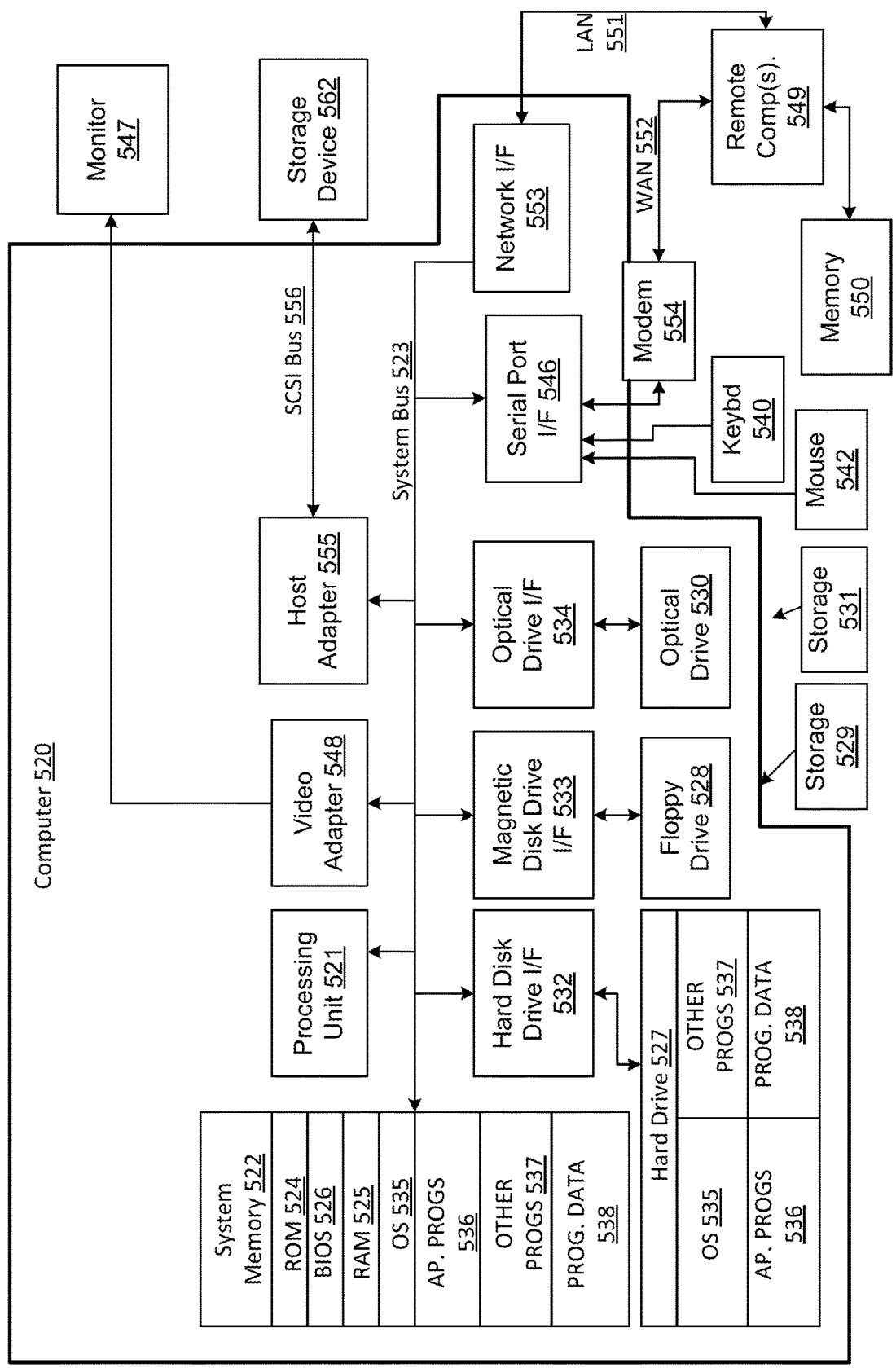
FIG. 6 is an exemplary block diagram representing a general purpose computer system in which aspects of the methods and systems disclosed herein may be incorporated.

FIG. 6 and the following discussion are intended to provide a brief general description of a suitable computing environment in which the methods and systems disclosed herein and/or portions thereof may be implemented. For example, a cooling tower system asset model may be stored on and/or executed by one or more devices that include some or all of the aspects described in regard to FIG. 6. Some or all of the devices described in FIG. 6 that may be used to perform functions of the claimed embodiments may be configured in a computing device that is remote from a physical location of a cooling tower system to be monitored or located at the physical location. Some or all of the devices described in FIG. 6 may be included in any device, combination of devices, or any system that performs any aspect of a disclosed embodiment.

Although not required, the methods and systems disclosed herein may be described in the general context of computer-executable instructions, such as program modules, being executed by a computer, such as a client workstation, server or personal computer. Such computer-executable instructions may be stored on any type of computer-readable storage device that is not a transient signal per se. Such devices may include, but are not limited to, compact disks, digital versatile discs, hard drives, and memory of any type. Generally, program modules include routines, programs, objects, components, data structures and the like that perform particular tasks or implement particular abstract data types. Moreover, it should be appreciated that the methods and systems disclosed herein and/or portions thereof may be practiced with other computer system configurations, including hand-held devices, multi-processor systems, microprocessor-based or programmable consumer electronics, network PCs, minicomputers, mainframe computers and the like. The methods and systems disclosed herein may also be practiced in distributed computing environments where tasks are performed by remote processing devices that are linked through a communications network. In a distributed computing environment, program modules may be located in both local and remote memory storage devices.

FIG. 6 is a block diagram representing a general purpose computer system in which aspects of the methods and systems disclosed herein and/or portions thereof may be incorporated. As shown, the exemplary general purpose computing system includes computer 520 or the like, including processing unit 521, system memory 522, and system bus 523 that couples various system components including the system memory to processing unit 521. System bus 523 may be any of several types of bus structures including a memory bus or memory controller, a peripheral bus, and a local bus using any of a variety of bus architectures. The system memory may include read-only memory (ROM) 524 and random access memory (RAM) 525. Basic input/output system 526 (BIOS), which may contain the basic routines that help to transfer information between elements within computer 520, such as during start-up, may be stored in ROM 524.

Computer 520 may further include hard disk drive 527 for reading from and writing to a hard disk (not shown), magnetic disk drive 528 for reading from or writing to removable magnetic disk 529, and/or optical disk drive 530 for reading from or writing to removable optical disk 531 such as a CD-ROM or other optical media. Hard disk drive 527, magnetic disk drive 528, and optical disk drive 530 may be connected to system bus 523 by hard disk drive interface 532, magnetic disk drive interface 533, and optical drive interface 534, respectively. The drives and their associated computer-readable media provide non-volatile storage of computer-readable instructions, data structures, program modules and other data for computer 520.

Although the exemplary environment described herein employs a hard disk, removable magnetic disk 529, and removable optical disk 531, it should be appreciated that other types of computer-readable media that can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on hard disk drive 527, magnetic disk 529, optical disk 531, ROM 524, and/or RAM 525, including an operating system 535, one or more application programs 536, other program modules 537 and program data 538. A user may enter commands and information into the computer 520 through input devices such as a keyboard 540 and pointing device 542. Other input devices (not shown) may include a microphone, joystick, game pad, satellite disk, scanner, or the like. These and other input devices are often connected to the processing unit 521 through a serial port interface 546 that is coupled to the system bus, but may be connected by other interfaces, such as a parallel port, game port, or universal serial bus (USB). A monitor 547 or other type of display device may also be connected to the system bus 523 via an interface, such as a video adapter 548. In addition to the monitor 547, a computer may include other peripheral output devices (not shown), such as speakers and printers. The exemplary system of FIG. 6 may also include host adapter 555, Small Computer System Interface (SCSI) bus 556, and external storage device 562 that may be connected to the SCSI bus 556.

The computer 520 may operate in a networked environment using logical and/or physical connections to one or more remote computers or devices. Remote computer 549 may be a personal computer, a server, a router, a network PC, a peer device or other common network node, and may include many or all of the elements described above relative to the computer 520, although only a memory storage device 550 has been illustrated in FIG. 6. The logical connections depicted in FIG. 6 may include local area network (LAN) 551 and wide area network (WAN) 552. Such networking environments are commonplace in offices, enterprise-wide computer networks, intranets, and the Internet.

When used in a LAN networking environment, computer 520 may be connected to LAN 551 through network interface or adapter 553. When used in a WAN networking environment, computer 520 may include modem 554 or other means for establishing communications over wide area network 552, such as the Internet. Modem 554, which may be internal or external, may be connected to system bus 523 via serial port interface 546. In a networked environment, program modules depicted relative to computer 520, or portions thereof, may be stored in a remote memory storage device. It will be appreciated that the network connections shown are exemplary and other means of establishing a communications link between computers may be used.

Computer 520 may include a variety of computer-readable storage media. Computer-readable storage media can be any available tangible media that can be accessed by computer 520 and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible and non-transitory medium that can be used to store the desired information and which can be accessed by computer 520. Combinations of any of the above should also be included within the scope of computer-readable media that may be used to store source code for implementing the methods and systems described herein. Any combination of the features or elements disclosed herein may be used in one or more embodiments.

This written description uses examples to disclose the subject matter contained herein, including the best mode, and also to enable any person skilled in the art to practice the invention, including making and using any devices or systems and performing any incorporated methods. The patentable scope of this disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An analytic system comprising:
a memory comprising computer instructions; and
a processor coupled to the memory, wherein, when executing the computer instructions, the processor effectuates operations comprising:
retrieving an expression and one or more arguments for a calculation;
attaching time-series parameters as required to the arguments;
retrieving time-series data based on the attaching step;
converting the time-series data from an original unit associated with the data to a standard unit;
performing a calculation based on the expression to achieve a result; and
writing the result to a tag associated with the at least one argument, wherein the result is converted back to the original unit and the result is written to the tag using the original unit.

2. The system of claim 1 wherein the processor performs operations further comprising detecting a trigger event which initiates the operations.

3. The system of claim 1 wherein the retrieving step is performed by retrieving an expression from a set of standardized expressions that can be used universally across the time-series data.

4. The system of claim 1 wherein the processor performs further operations comprising receiving a customized expression from a user and the retrieving step retrieves the customized expression.

5. A method comprising:
determining, by a processor, whether an expression is a standardized expression that can be used universally across inconsistent time-series data;
retrieving, by a processor, based on the determining step, the standardized expression and one or more arguments for a calculation;
attaching, by the processor, time-series parameters as required to the arguments;
retrieving, by the processor from a database, time-series data based on the attaching step;
converting, by the processor, the time-series data from an original unit associated with the data to a standard unit;
performing a calculation based on the standardized expression to achieve a result; and
writing the result to a tag associated with the at least one argument, wherein the result is converted back to the original unit by the processor and the result is written to the tag using the original unit.

6. The method of claim 5 further comprising receiving, by the processor, a trigger event.

7. The method of claim 5 further comprising receiving, by the processor, a customized expression if the determining step determines that an expression is not a standardized expression and wherein the method is performed using the customized expression.

* * * * *